(12) United States Patent
Capt et al.

(10) Patent No.: US 10,169,481 B2
(45) Date of Patent: Jan. 1, 2019

(54) METHOD FOR INTELLIGENT WEB REFERENCE PRELOADING BASED ON USER BEHAVIOR PREDICTION

(71) Applicant: ADOBE SYSTEMS INCORPORATED, San Jose, CA (US)

(72) Inventors: Alexandre Capt, Landser (FR); Damien Antipa, Saint-Louis (FR)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 220 days.

(21) Appl. No.: 14/625,129

(22) Filed: Feb. 18, 2015

(65) Prior Publication Data
US 2016/0239468 A1     Aug. 18, 2016

(51) Int. Cl.
*G06F 17/00*     (2006.01)
*G06F 17/30*     (2006.01)
(Continued)

(52) U.S. Cl.
CPC .... *G06F 17/30902* (2013.01); *G06F 3/04842* (2013.01); *G06F 17/2235* (2013.01)

(58) Field of Classification Search
CPC ........................ G06F 17/2235; G06F 17/30902
See application file for complete search history.

(56) References Cited

U.S. PATENT DOCUMENTS 6,055,569 A * 4/2000 O'Brien ............ G06F 17/30902
707/E17.12

6,874,019 B2 * 3/2005 Hamilton, II ..... G06F 17/30902
707/E17.12
(Continued)

FOREIGN PATENT DOCUMENTS

AU     2015271945 A     9/2016
CN     105893446 A     8/2016
(Continued)

OTHER PUBLICATIONS

"PreventDefault( ) Event Method" W3Schools.com, retrieved from Internet Archive Wayback Machine capture dated Oct. 23, 2014, p. 1.*
(Continued)

*Primary Examiner* — Amelia L Tapp
(74) *Attorney, Agent, or Firm* — Shook, Hardy & Bacon, L.L.P.

(57) ABSTRACT

A preloading tool facilitates efficient loading for content associated with links in a web document. An index containing links for a current page is created. The index includes coordinates of the links and trigger area coordinates of a trigger area for each link. When a user interaction is detected in a trigger area indicating the user may wish to navigate to additional content (i.e., the predicted link), standard click behavior for the predicted link is disabled. Resources required to render the content (i.e., the new page) for the predicted link begin downloading and are cached. Once the user actually selects the link, the transition from the current page to the new page is accomplished without the new page appearing broken. In some instances, certain links are excluded from the index and/or target attributes point to one or more containers that will be updated by one or more of the links.

20 Claims, 6 Drawing Sheets

(51) Int. Cl.
*G06F 3/0484* (2013.01)
*G06F 17/22* (2006.01)

(56) References Cited

U.S. PATENT DOCUMENTS

| | | | | |
|---|---|---|---|---|
| 6,951,022 | B1 * | 9/2005 | Golde | G06F 9/542 |
| | | | | 719/318 |
| 7,788,601 | B2 * | 8/2010 | Scott | G06F 3/04892 |
| | | | | 715/812 |
| 8,069,406 | B2 * | 11/2011 | Weiss | G06F 17/30902 |
| | | | | 715/205 |
| 8,566,696 | B1 * | 10/2013 | Hamon | G06F 17/30899 |
| | | | | 715/205 |
| 2001/0020255 | A1 * | 9/2001 | Hofmann | G06F 9/541 |
| | | | | 719/318 |
| 2002/0184363 | A1 * | 12/2002 | Viavant | H04L 63/1416 |
| | | | | 709/224 |
| 2013/0191742 | A1 * | 7/2013 | Iino | G06F 3/0481 |
| | | | | 715/704 |
| 2015/0193554 | A1 * | 7/2015 | Yang | G06F 17/30867 |
| | | | | 715/205 |
| 2015/0371142 | A1 * | 12/2015 | Jain | G06F 17/30902 |
| | | | | 706/52 |
| 2016/0188542 | A1 * | 6/2016 | Burkard | G06F 17/30902 |
| | | | | 715/205 |

FOREIGN PATENT DOCUMENTS

| | | |
|---|---|---|
| DE | 102016001467 A1 | 8/2016 |
| GB | 2536354 A | 9/2016 |

OTHER PUBLICATIONS

Ankit, "How to Disable HyperLink using Jquery-3 Techniques" Spice Forms Blog, Dec. 1, 2014, retrieved from http://www.spiceforms.com/blog/disable-hyperlink-using-jquery-3-techniques/ p. 1-3.*

* cited by examiner

METHOD FOR INTELLIGENT WEB REFERENCE PRELOADING BASED ON USER BEHAVIOR PREDICTION

BACKGROUND

The World Wide Web has enabled a vast collection of documents to be accessible to many users via the Internet. Using a web browser, users can view these documents that may contain text, images, videos, other forms of multimedia, as well as navigate to additional content or other documents via hyperlinks. Depending on the speed of the various networks and latency of devices utilizing and providing these networks, the loading times of various documents or content provided by the documents can vary. When a user clicks on a particular link, a delay ranging from a few milliseconds to several seconds before the document or content associated with the link begins loading results. During this delay, the user may see the document or content associated with the link rendered progressively, which often causes the document or content to appear broken until it is fully loaded. Long loading times can frustrate users, often leading to a bad user experience or causing the user to give up altogether and seek a similar document or content from another source.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to more effectively loading content from a web page. More particularly, some embodiments are directed to preloading content based on user behavior prediction. As such, upon a prediction a user will click on a particular link within a document, the resources required to render the content for the predicted link begin downloading and are cached before the user selects the link. Once the user actually selects the link, the new content can be displayed without having to download it and the transition from the previous document to the new document is accomplished without the new document appearing broken. In this regard, virtually all latency is removed and the user experiences a seamless transition.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The terms "page" and "document" refer to a collection of content that is suitable for the World Wide Web and can be rendered by a web browser. A web browser displays the page or document via a monitor or a mobile device. The page or document may comprise HyperText Markup Language (HTML), cascading style sheets (CSS), and JavaScript (JS) that are utilized by the web browser to present the page.

The term "HyperText Markup Language" or "HTML" refers to the standard markup language used to create web pages. A web browser is able to read HTML files and render them as visible or audible web pages. HTML allows images, objects, or scripts to be embedded and can be used to create structured documents and interactive forms. HTML may further refer to CSS to define the look and layout of the page.

The term "cascading style sheets" or "CSS" refers to a style sheet language that is utilized to describe the look and formatting of a document written in a markup language. Elements such as layout, colors, and fonts may be defined by the CSS. Multiple HTML pages may share formatting by pointing to the relevant CSS stored in a separate .css file.

The term "JavaScript" or "JS" refers to a computer programming language used by web browsers to allow client-side scripts to interact with the user, control the browser, and alter document content that is displayed.

A "current page" is the page that is currently being rendered by the web browser and viewable by the user via the monitor or mobile device. The current page displays a variety of content and may contain links to additional content (i.e., a target page).

A "target page" is the page that will be rendered by the web browser upon selection of or interaction with a link provided by the current page. The target page comprises content, some of which may be in common with content of the current page.

A "link" or "hyperlink" is a reference to content that may be a new document or specific content (i.e., the "target page") within a document. A user may navigate to the content by selecting or otherwise interacting with the link. Upon selection, the web browser renders the content referenced by the link.

A "document object model" or "DOM" refers to a cross-platform and language-independent representation of objects in HTML documents. When an HTML document is rendered in a web browser, the browser downloads the HTML into local memory and parses the document into a DOM. The nodes of a document, including any links, are organized in a tree structure referred to as the DOM tree.

An "index" is a listing of all the links in a DOM. The index includes coordinates of each link. The index further includes a trigger area and trigger area coordinates for each link.

A "trigger area" is a region or area around a link that, when entered (e.g., such as by a cursor being moved via a mouse, stylus, touch input, gaze or gesture, and the like, into the trigger area) indicates the user may have an intention to navigate to the link corresponding to that trigger area. Trigger areas corresponding to more than one link may overlap indicating the user may have an intention to navigate to more than one link.

The term "target attributes" refers to a pointer to one or more containers that will be updated upon selection of a particular link.

A "container" refers to a portion of a web page. The containers allow a developer to specify, by using target attributes, which portions of the web page should be updated when the user selects a particular link.

A "user interaction" is any interaction with the trigger area that indicates a user is likely to select a link within the trigger area. Exemplary interactions include interaction with a touch device or by the user navigating a cursor into the trigger area. Navigation of the cursor may be facilitated by a mouse, a touchpad, a stylus, or via gesture.

The term "standard click behavior" refers to the normal response of a user selecting a link. For example, when a user selects or clicks on a link, content associated with the link begins downloading and the web browser begins rendering the content as it is downloaded.

A "click handler" refers to code that replaces the standard click behavior and triggers the transition to the target page.

A "transition" is the process that occurs when a link is selected and the web browser changes from rendering content of the current page to rendering content of the target page.

As discussed previously, a vast collection of documents is accessible to many users via the Internet. Each of these documents may contain text, images, videos, and other forms of multimedia, as well as links to additional content or other documents. Users can view these documents and/or navigate to the additional content or other documents using a web browser. The speed of the various networks and latency of devices utilizing and providing these networks that connect the location of the content or documents to the end user can greatly influence the loading times of the various documents and content provided by the documents. After selection of a link to navigate to the content or document, delays ranging from a few milliseconds to several seconds before the document or content associated with the link begins loading cause the document or content associated with the link to be rendered progressively. The progressive rendering, in turn, causes the document or content to appear broken until it is fully loaded. This choppiness between content frustrates users and results in a negative user experience, or worse, causes the user to give up altogether and seek similar content from another source.

To mitigate these delays, some web developers utilize JavaScript and only update portion of a document when the user navigates to it or selects a link to update that portion. However, because this relies on user selection of the link, some delays still exist even while that portion is updated. Other web developers may identify content that will be reused and place that content on a content delivery network (CDN) to reduce the latency between the web server and the end user device as well as the amount of content that is ultimately transferred from the web server to the end user device. However, in each of these circumstances, no content is actually transferred until a user clicks on a link associated with that content and some delay still persists.

Some embodiments of the present invention are directed to predicting user behavior. Some embodiments of the present invention are directed to preloading content based on the user behavior prediction. As such, upon a prediction a user will click on a particular link within a document, the resources required to render the content for the predicted link begin downloading and are cached before the user even selects the link. Once the user actually selects the link, the new content can be displayed without having to download it and the transition from the previous document to the new document is accomplished without the new document being rendered progressively or appearing broken. In this regard, virtually all latency is removed and the user experiences a seamless transition from the current page to a target page.

Predicting user behavior is accomplished utilizing trigger areas defined by the web developer. Trigger areas can be defined for each link in a document. As described above, the trigger areas are regions or areas around a link that, upon user interaction with the trigger area, indicate the user may intend to visit a link corresponding to the trigger area. In embodiments, target attributes are defined that point to one or more containers that will be updated upon selection of a particular link. As each document is loaded by a web browser, all links in the DOM are identified and an index is created. The index includes all links, coordinates of the links, and trigger area coordinates corresponding to trigger areas associated with each link. In some instances a web developer may utilize target attributes to identify containers that should be updated upon selection of a link. Additionally or alternatively, the web developer may exclude one or more links from the index so those links will not benefit from the user behavior prediction and preloading as described herein. When a user interaction is detected within a trigger area, it is predicted that the user intends to select the corresponding link. Standard click behavior for that link is disabled which allows the content corresponding to the link to be downloaded before the user actually selects the link.

Once the user actually selects the link, the web browser transitions to the target page (i.e., the content associated with the link). The transition may take several forms. For example, the document associated with the current page may be momentarily hidden. Cascading style sheets (CSS) and JavaScript for the current page are unloaded and content is removed from the body of the current page. The CSS and JavaScript of the target page is compared with the CSS and JavaScript of the current page to determine what, if anything, needs to be updated from the current page to the target page. If any CSS or JavaScript needs to be updated, the cached CSS and JavaScript are injected in the document. Similarly, new content is injected into the body of the document and the document is unhidden. In another example, only the HTML of the body is loaded during the transition. Similarly, if a target attribute is specified, only specified containers are loaded during the transition. As can be appreciated, only customized content may loaded during the transition based on certain portions of content being included or excluded by a developer of the target page.

In each example, because the HTML for the target page has already been downloaded prior to the user selecting the link, the transition from the current page to the target page occurs with virtually no latency and there is no progressive rendering or appearance of a broken link. Instead, a very brief graphic or transition page may be provided that indicates to the user that the link was selected and the page is rendered. Once the target page is rendered, the index is rebuilt and the process is repeated. In some embodiments, any interaction that causes the coordinates of a link or trigger area to change (e.g., page resizing) also causes the index to be rebuilt.

Figure 1:
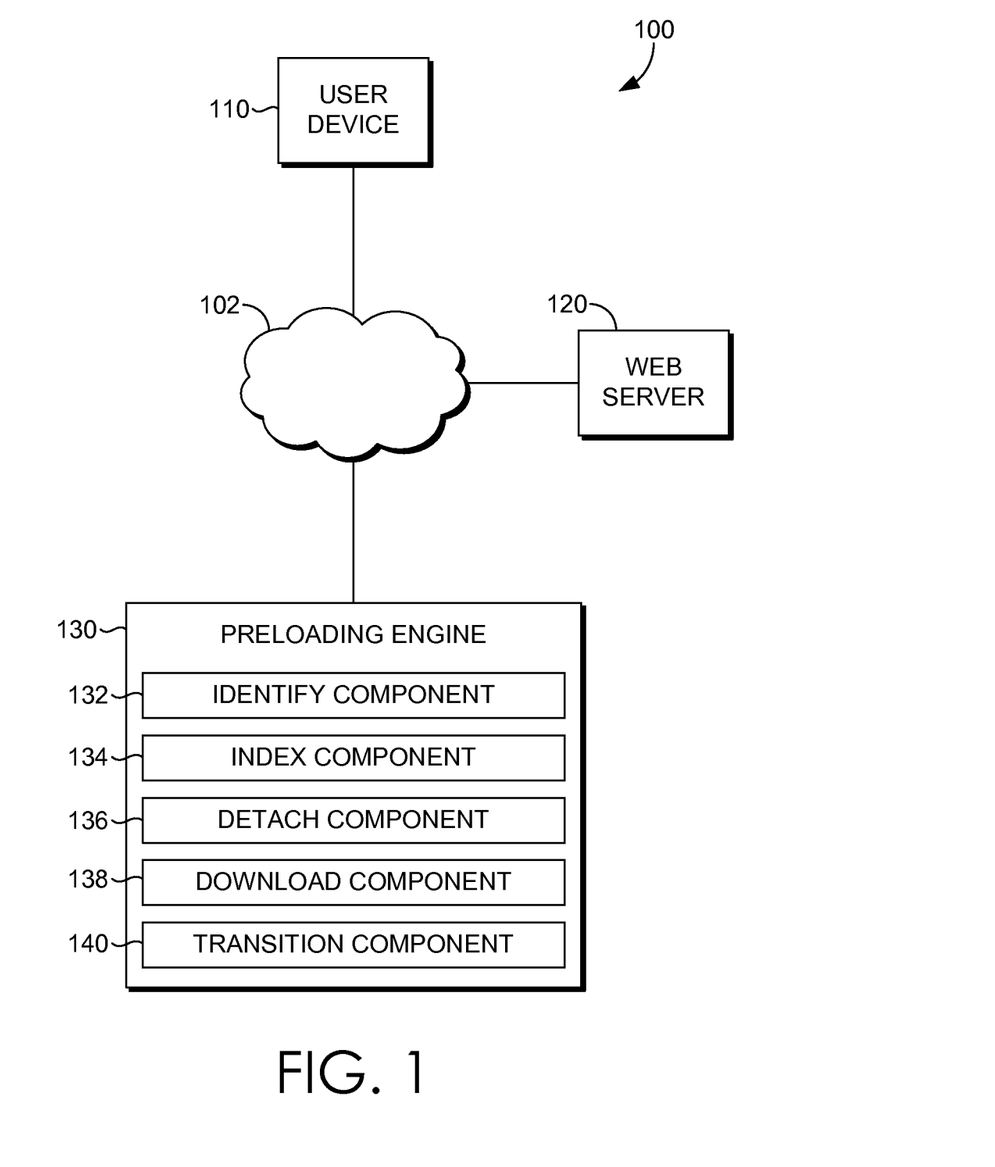
FIG. 1 is a block diagram showing a system for intelligent web reference preloading based on user behavior prediction in accordance with an embodiment of the present invention.

Referring now to FIG. 1, a block diagram is provided that illustrates a preloading system 100 for predicting user behavior and preloading web content in accordance with embodiments of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The preloading system 100 generally operates to predict links a user may select and download the content corresponding to the link before the user actually selects the link. Transitioning from current content to target content can thus be accomplished with nearly zero latency and without the target content being rendered progressively or appearing broken. Among other components not shown, the system 100 may include a user device 110, a web server 120, and a preloading tool 130. It should be understood that the system 100 shown in FIG. 1 is an example of one suitable computing system architecture. Each of the components shown in FIG. 1 may be implemented via any type of computing device, such as computing device 800 described with reference to FIG. 8, for example. The components may communicate with each other via a network 102, which may include, without limitation, one or more local area networks (LANs) and/or wide area networks (WANs). Such networking environments are commonplace in offices, enterprise-wide computer networks, intranets, and the Internet. It should be understood that any number of user devices, web servers, preloading tools, and networks may be employed within the system 100 within the scope of the present invention. Each may comprise a single device or multiple devices cooperating in a distributed environment. For instance, the preloading tool 130 may be provided via multiple devices arranged in a distributed environment that collectively provide the functionality described herein. In another instance, portions of the preloading tool 130 may be provided by the user device 110, the web server 120, or as a web service provided in the cloud. Similarly, portions of the preloading tool may be provided by each of the user device 110, the web server 120, and as a web service provided in the cloud. Additionally, other components not shown may also be included within the network environment.

As shown in FIG. 1, the preloading system 100 includes a preloading tool 130 that includes, among other things not shown, an identify component 132, an index component 134, a detect component 136, a download component 138, and a transition component 140. Identify component 132 of the preloading tool 130 identifies one or more links in a DOM of a current page that is loaded via the web browser running on the user device 110. Because the DOM defines each of the links, as well as coordinates for each link, the DOM is parsed by identify component 132 to identify each link and associated coordinates provided by the current page. In embodiments, the DOM also defines each of the trigger areas, as well as coordinates for each trigger area, and the DOM is parsed by identify component 132 to identify each trigger area and associated coordinates provided by the current page.

Index component 134 of the preloading tool 130 creates an index containing the one or more links as well as coordinates for the links. The index further includes coordinates of a trigger area for each link in the index, defined by the web developer and identified in the DOM by identify component 132, as a default trigger area specified by the preloading tool 130, or in accordance with user preferences. The trigger area defines an area or region that, upon user interaction with the trigger area corresponding to a particular link, indicates the user may have an intention to visit that link. In some embodiments, target attributes may point to one or several containers that will be updated by a link. This allows a developer to specify what should be downloaded and/or updated when the user interacts with a trigger area or selects a link. Additionally or alternatively, some of the links may be excluded from the index. In this regard, a developer may wish to exclude certain portions of a web page from predicting user behavior and/or preloading content as described herein. If an event occurs that changes coordinates of links or trigger areas (e.g., a page re-size), identify component 132 identifies the new coordinates and the index component 134 rebuilds the index.

Detect component 136 of the preloading tool 130 detects a user interaction with a trigger area associated with a link. The user interaction may correspond to the movement of a cursor, such as may be made via a mouse, a stylus, or touch input. Similarly the user interaction may correspond to gaze or gesture detection. In some embodiments, a user interaction can be detected by detect component 136 for more than one trigger area associated with more than one link. For example, the links may be in close enough proximity to each other on the page such that the trigger areas overlap. In this way, a user interaction can be detected in more than one trigger area at the same time. Detect component 136 further disables standard click behavior for the link or links. This prevents the user from actually selecting the link before download component 138 has downloaded the content associated with the link or links.

Once a user interaction has been detected in one or more trigger areas, download component 138 begins downloading content that will be updated if the user actually selects the link or links corresponding to the trigger area or trigger areas. Download component 138 downloads content in accordance with web developer preferences. For example, the web developer may only designate the HTML of the body or of specified containers (when a target attribute is specified that points to specific containers to be updated) to be downloaded and cached. In this case, the container is parsed from the web server. Similarly, the web developer may designate certain portions of the page or particular links to be excluded from the user behavior prediction and/or preloading process described herein. In another example, the web developer may designate the entire document to be updated. In yet another example, the web developer may customize what is loaded and unloaded as well as cleanup of the page on unload.

After the content is successfully and fully downloaded, standard click behavior for the link or links is re-enabled by transition component 140 of the preloading tool 130. Once the transition component 140 detects a user interaction with the link, transition component 140 transitions from the current page to the target page. Transition component 140 may further provide a graphic or transition page briefly until the target page is fully available and provided. This enables the target page to be displayed in its entirety without appearing broken or being rendered progressively. Once the target page is displayed, the process repeats and identify component 132 identifies the links of the now rendered target page and the index component 134 builds a new index.

Figure 2:
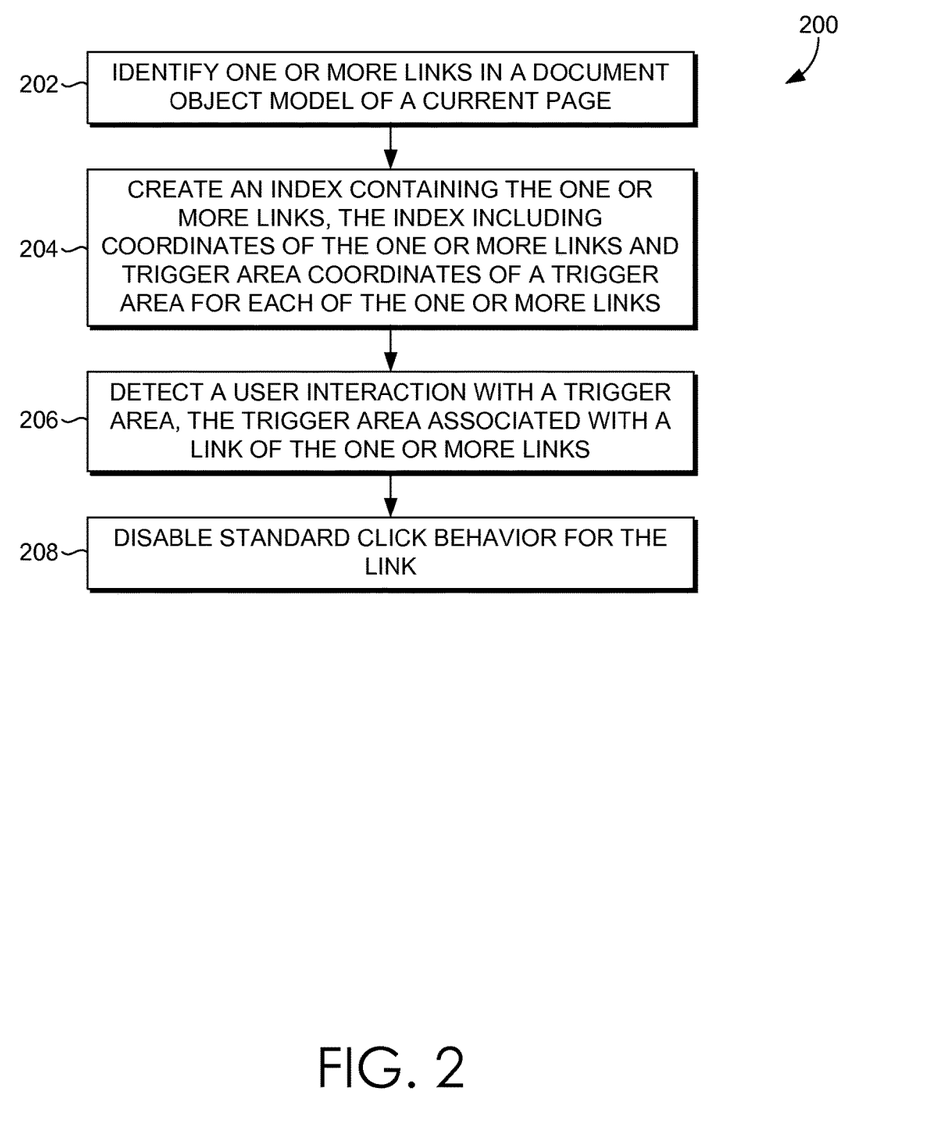
FIG. 2 is a flow diagram showing a method for predicting user behavior in accordance with an embodiment of the present invention.

With reference now to FIG. 2, a flow diagram is provided that illustrates a method 200 for user behavior prediction in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be provided as part of a prediction tool, such as the prediction tool 130 of FIG. 1.

As shown at block 202, one or more links in a DOM of a current page are identified. As described above, the DOM is parsed to identify each link as well as coordinates for each link. In some embodiments, the DOM is also parsed to identify trigger areas and trigger area coordinates corresponding to each link. In some embodiments, trigger areas and trigger area coordinates are set at default locations. In some embodiments, trigger areas and trigger area coordinates may be set in accordance with user preferences.

An index containing the links is created, at block 204. The index includes coordinates of the links as well as trigger area coordinates for the trigger areas corresponding to each of the links. As described above, the trigger area coordinates may be defined by the web developer, set as a default area around each link, or specified by user preference. Any event that causes the coordinates of the links or trigger areas to change may result in the DOM being parsed again and the index being rebuilt. For example, if the page is resized or the user is able to reorganize or resize content within the page, the coordinates of the links and trigger areas may change and the index needs to be rebuilt. Similarly, if the user is interacting with more than one device and the page transitions from one device to another device, the index may need to be rebuilt for the new device.

Figure 4:
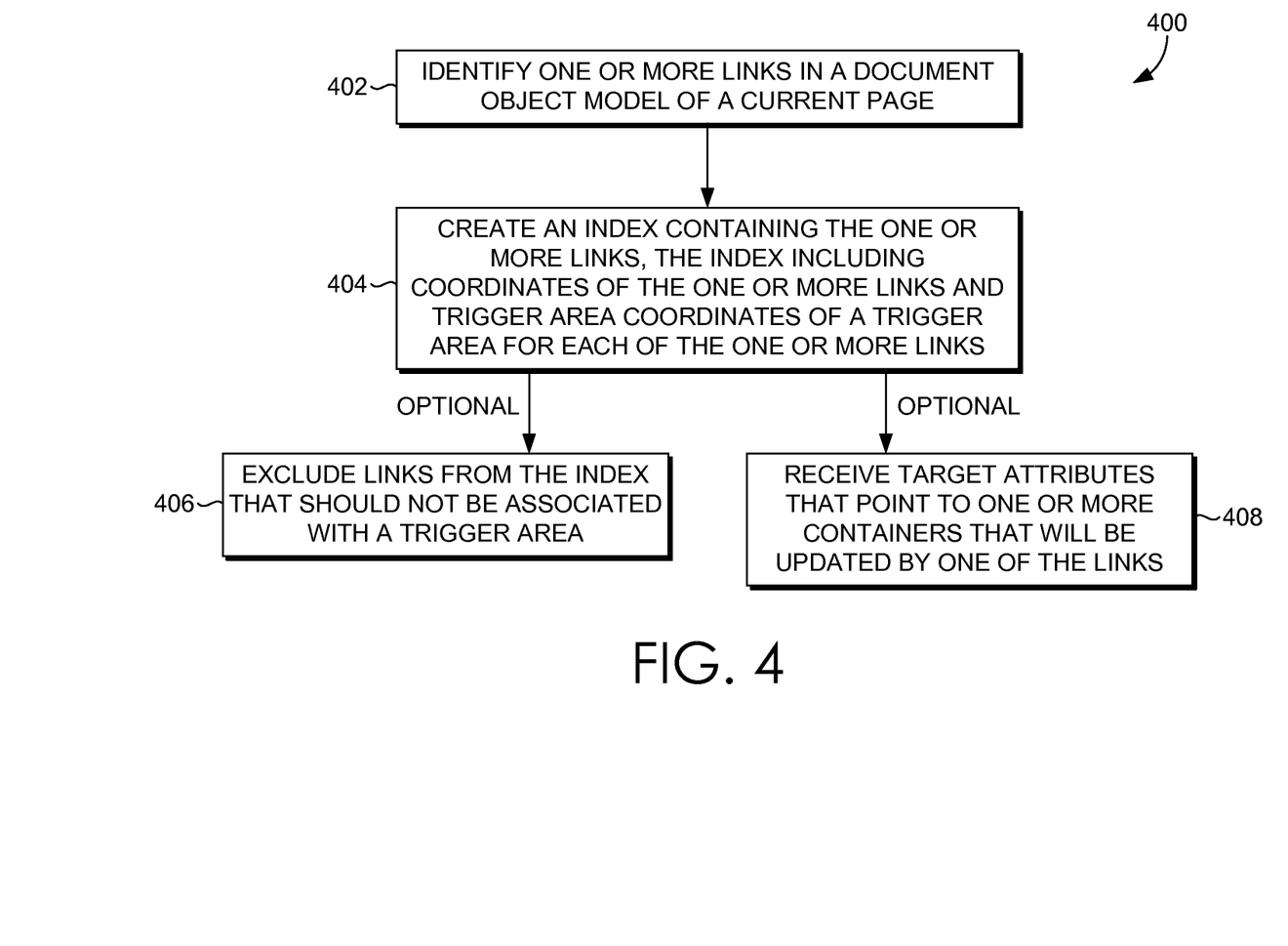
FIG. 4 is a flow diagram showing a method for creating an index in accordance with an embodiment of the present invention.

Referring now to FIG. 4, a flow diagram is provided that illustrates a method 400 for creating an index in accordance with embodiments of the present invention. The method 400 may be performed, for instance, by the preloading tool 130 of FIG. 1. As shown at block 402, one or more links in a DOM of a current page are identified. An index containing the links is created at block 404. The index includes coordinates of the one or more links and trigger area coordinates of trigger areas corresponding to each of the links.

In some embodiments, as shown at block 406, one or more links are excluded from the index that should not be associated with a trigger area. For example, the web developer for the current page may not want all links to be associated with a trigger area and benefit from the user behavior prediction or preloading as described herein. In this regard, the web developer may not define a trigger area for those particular links. Additionally or alternatively, the web developer may affirmatively define these links to be excluded from the index. In either case, a user interacting with the current page does not predict user behavior or preload the content corresponding to these links.

In some embodiments, as shown at block 408, target attributes that point to one or more containers that will be updated upon selection of a link is received. For example, the web developer may designate specific containers within the current page that will be updated upon interaction with a particular link. These containers may be identified by identification (id) within the HTML of the current page by the web developer. When the DOM identifies the links and the index is created, the target attributes are received and added to the index. When the user interacts with a link associated with target attributes, the containers specified by the target attributes are parsed from the web server and updated by the web browser on the user device. To illustrate, a web developer may specify that CSS and JS should not be preloaded and only the HTML of the body of the page or specified containers will be updated. In this regard, only the designated portions of the current page are updated while the remainder of the page remains static.

In some embodiments, global events (e.g., page load and unload) are provided, such as by preloading tool 130 of FIG. 1, that simulate the standard load and unload events normally provided by the browser. The web developer registers to these global events instead of the standard load and unload events. It is then up to the developer to take care of page cleanup during unload to cleanup any custom code that is run during the load event.

Referring again to FIG. 2, and as shown at block 206, a user interaction with a trigger area is detected. The user interaction may be a cursor being moved via a mouse, stylus, or touch input into the trigger area. Similarly, the user interaction may be made via gaze or gesture in the trigger area. In either instance, the user interaction indicates the user may have an intention to navigate to the link corresponding to that trigger area. In this regard, user behavior is predicted. Consequently, standard click behavior for the link is disabled and replaced by a click handler, at block 208. This prevents the user from navigating to the link before the content corresponding to the link has been downloaded.

Figure 3:
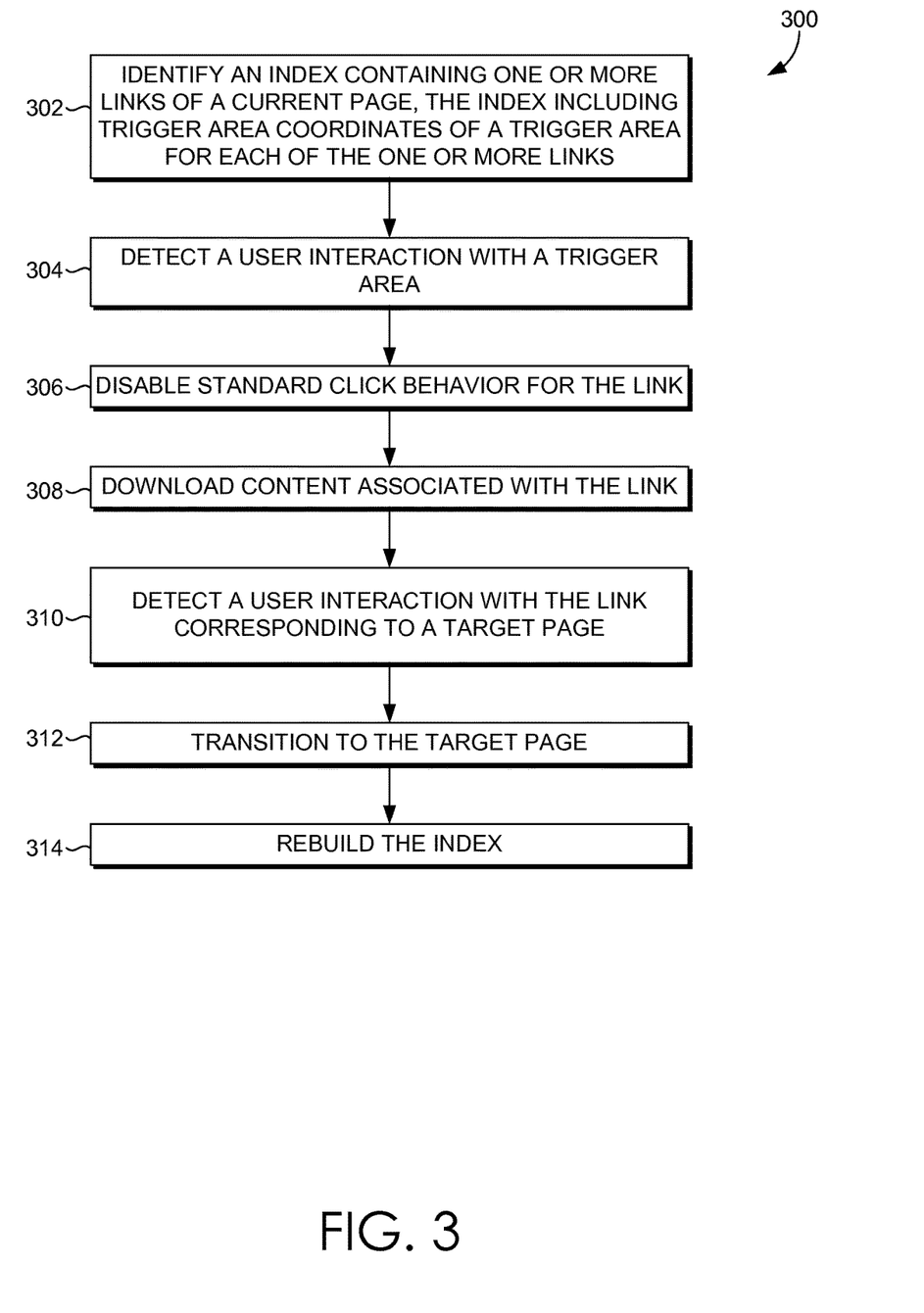
FIG. 3 is a flow diagram for predicting user behavior and web reference preloading in accordance with embodiments of the present invention.

Referring next to FIG. 3, a flow diagram is provided that illustrates a method 300 for user behavior prediction and web reference preloading in accordance with an embodiment of the present invention. Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 300 may be provided as part of a prediction tool, such as the prediction tool 130 of FIG. 1.

As shown at block 302, an index containing one or more links of a current page is identified. In some embodiments, the index may be based on a default process that identifies all the links in the DOM of a current page. The index includes trigger area coordinates of a trigger area for each of the one or more links. In some embodiments, the index is based on web developer preferences. In this regard, the web developer may elect to exclude or include certain portions of the page from the index. For example, the web developer may not want all links included in the index. Similarly, the web developer may not want certain portions of the page to be preloaded (e.g., CSS and/or JS). The web developer may also specify target attributes that point to containers that should be preloaded instead of the whole document.

At block 304, a user interaction is detected with a trigger area. As described above, it is possible for the user to interact with more than one trigger area at a time. Depending on the size of the trigger areas, per web developer design, default behavior, or user preferences, one or more of the trigger areas may overlap. Once the user interaction has been detected in a trigger area, at block 306, standard click behavior for the link corresponding to the trigger area is disabled and replaced with a click handler. This prevents the user from selecting the link before the preloading is complete.

Content associated with the link is downloaded at block 308. The content may be downloaded in a variety of ways. In one embodiment, only the HTML of the body or of specified containers (if a target attribute is specified) is preloaded. When a container is specified instead of the whole document, the container is parsed from the web server. In one embodiment, the whole document, including the CSS and JS, is preloaded. In another embodiment, the web developer may utilize custom global events to load and unload customized portions of the page. In this case, the developer must cleanup the page on unload. For example, the developer may adapt JS code for the global load and unload events that might not work in the container mode to create custom global load and unload events.

After the content has been downloaded, a user interaction is detected by the click handler, at block 310, with the link corresponding to the target page. Once the user interaction is detected, the web browser transitions, at block 312, from the current page to the target page.

Figure 5:
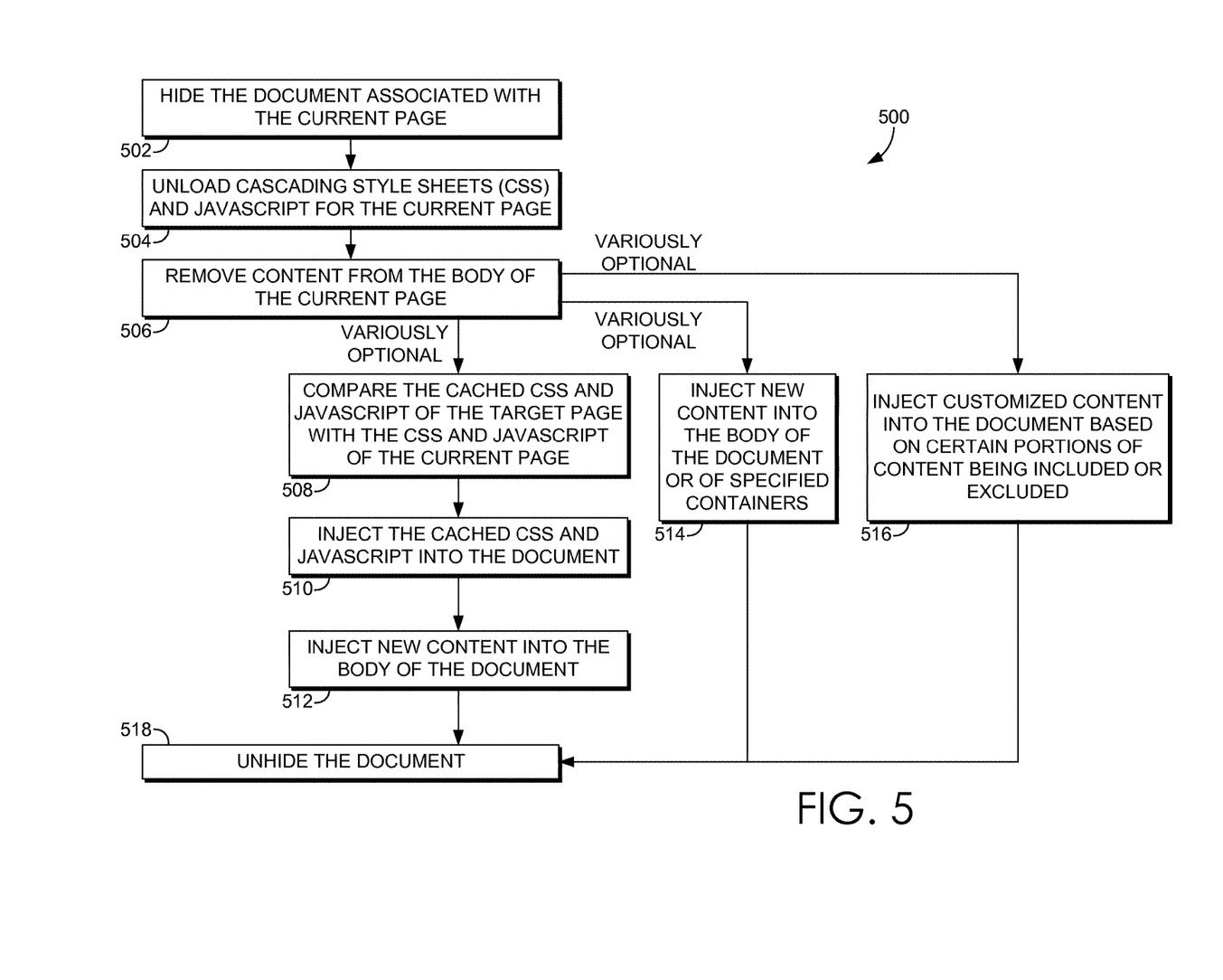
FIG. 5 is a flow diagram showing a method for transitioning from a current page to a target page in accordance with an embodiment of the present invention.

In some embodiments, and referring now to FIG. 5, the transition may occur in several forms. The document associated with the current page is hidden at block 502. To do so, the web browser may temporarily provide a graphic or transition page that indicates to the user that the link was selected and the target page is being rendered. CSS and JS may be unloaded for the current page at block 504. Similarly, content from the body of the current page may be removed at block 506.

In one embodiment, as shown at block 508, the cached CSS and JS of the target page are compared to the CSS and JS of the current page. Based on that comparison, any CSS or JS that has changed is injected into the document, at block 510. In this regard, any CSS or JS that is different between the current page and the target page is updated. New content (e.g., the HTML of the body for the target page or of specified containers) is injected into the body of the document at block 512. At block 518, the document is unhidden.

In one embodiment, as shown at block 514, new content is injected into the body of the document or of specified containers. However, no CSS or JS is updated. At block 518, the document is unhidden.

In one embodiment, as shown at block 516, customized content is injected into the document based preferences of a developer of the target page. In this way, certain portions of content may be included or excluded. At block 518, the document is unhidden.

Referring back to FIG. 3, at block 314, the index is rebuilt. Each link in the DOM for the target page is identified and the index is rebuilt containing the links, coordinates for the links, and trigger area coordinates for trigger areas corresponding to each link. As previously described, the web developer may exclude particular links from the index or include target attributes that point to one or more containers that will be updated by a particular link.

Figure 6:
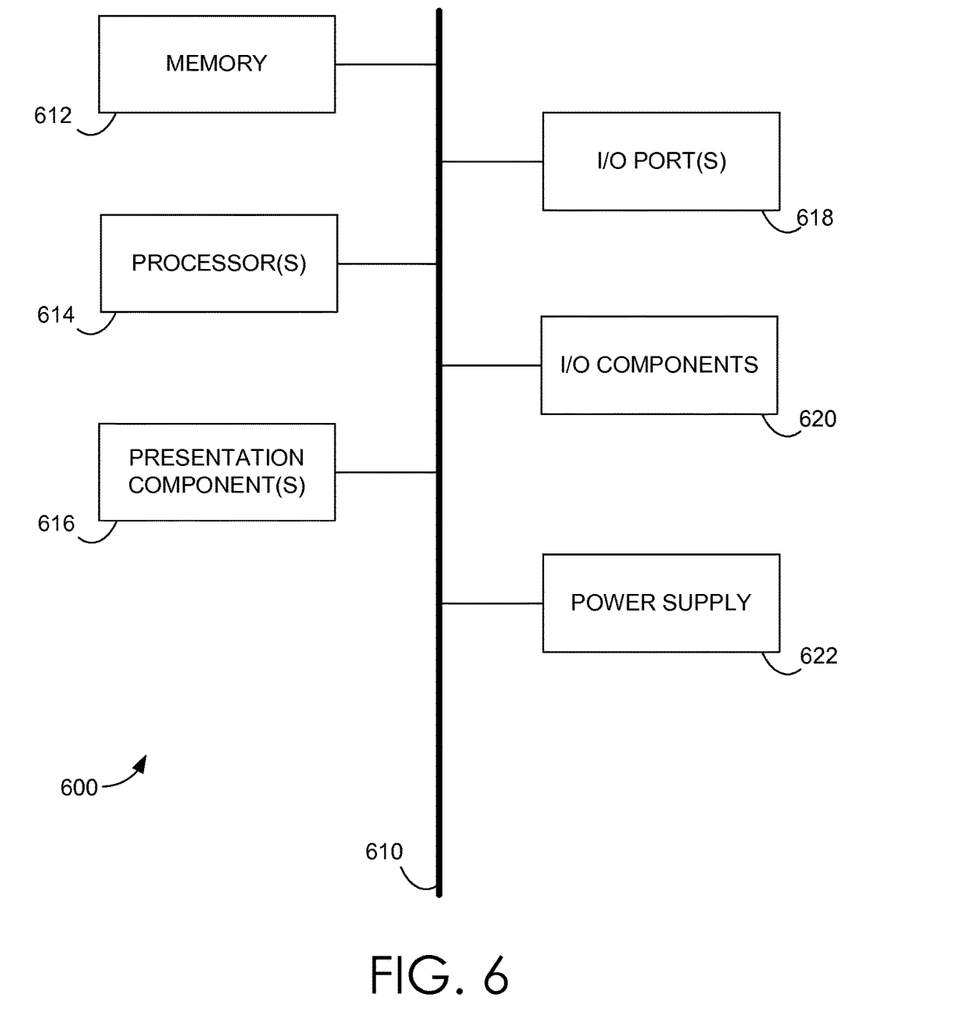
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention preload web content based on user behavior prediction. Some embodiments enable preloading of all content associated with a predicted link. In other embodiments, target attributes may be specified that enable preloading of HTML for only the body or specified containers. Further embodiments enable a developer to customize global events (e.g., page load and unload). The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage media storing computer-useable instructions that, when used by one or more computing devices, cause the one or more computing devices to perform operations comprising:
    identifying one or more links in a document object model of a document corresponding to a current page provided via a browser;
    creating an index containing the one or more links, the index including coordinates of the one or more links and predefined trigger area coordinates of an individual trigger area for each of the one or more links, wherein each trigger area is a predefined area around a corresponding link from the one or more links;
    detecting a user interaction, the user interaction corresponding to movement of a cursor within a first trigger area, the first trigger area associated with a first link of the one or more links, the user interaction occurring before selection of the first link associated with the first trigger area; and
    upon detecting the user interaction within the first trigger area, disabling standard click behavior for the first link.

2. The one or more computer storage media of claim 1, further comprising downloading an HTML document corresponding to the link.

3. The one or more computer storage media of claim 1, further comprising parsing content of an HTML document corresponding to the link to retrieve associated images, cascading style sheets (CSS), and JavaScript.

4. The one or more computer storage media of claim 3, further comprising downloading the images, CSS, and JavaScript for caching.

5. The one or more computer storage media of claim 1, further comprising updating the index if an event influences the coordinates of the one or more links or trigger area coordinates of a trigger area for one of the one or more links.

6. The one or more computer storage media of claim 1, further comprising determining a link of the one or more links has been identified as excluded.

7. The one or more computer storage media of claim 6, further comprising, based on the determining, excluding the link from the index.

8. The one or more computer storage media of claim 1, further comprising identifying one or more target attributes that point to one or more containers that will be updated by the one or more links.

9. The one or more computer storage media of claim 8, further comprising downloading the one or more containers that will be updated by the link.

10. The one or more computer storage media of claim 1, further comprising detecting a user interaction with the link, the link corresponding to a target page.

11. The one or more computer storage media of claim 10, further comprising transitioning to the target page.

12. The one or more computer storage media of claim 11, wherein transitioning to the target page comprises:
   hiding the document associated with the current page;
   unloading cascading style sheets (CSS) and JavaScript for the current page;
   removing content from the body of the current page;
   comparing the CSS and JavaScript of the target page with the CSS and JavaScript of the current page;
   injecting the cached CSS and JavaScript into the document;
   injecting new content into the body of the document; and
   unhiding the document.

13. The one or more computer storage media of claim 11, wherein transitioning to the target page comprises only loading the HTML of the body or of specified containers if a target attribute is specified.

14. The one or more computer storage media of claim 11, wherein transitioning to the target page comprises only loading customized content based certain portions of content being included or excluded by a developer of the target page.

15. The one or more computer storage media of claim 11, further comprising rebuilding the index.

16. A computerized method for intelligent web reference preloading based on user behavior prediction, the computerized method comprising:
   identifying, via a first computing process, an index containing one or more links of a current page, the index including predefined trigger area coordinates of an individual trigger area for each of the one or more links, wherein each trigger area is a predefined area around a corresponding link;
   detecting, via a second computing process, a user interaction within a first trigger area indicating a prediction a user will click on a first link associated with the first trigger area, the user interaction occurring prior to clicking the first link associated with the first trigger area;
   disabling, via a third computing process, standard click behavior for the first link;
   replacing, via a fourth computing process, the standard click behavior for the first link with a click handler;
   downloading, via a fifth computing process, content associated with the first link;
   detecting, via a sixth computing process, a user interaction with the click handler, the click handler corresponding to a target page;
   transitioning, via a seventh computing process, from the current page to the target page; and
   rebuilding, via an eighth computing process, the index for the document;
   wherein each of the computing processes is performed by one or more computing devices.

17. The computerized method of claim 16, wherein the content does not include cascading style sheets or JavaScript.

18. The computerized method of claim 16, wherein the content is identified by one or more target attributes that point to one or more containers that will be update upon user interaction with one of the one or more links.

19. The computerized method of claim 16, further comprising identifying, via an eleventh computing process, excluded links of the current page, the excluded links not being built into the index.

20. A computerized system comprising:
   one or more processors; and
   a non-transitory computer storage media storing computer-useable instructions that, when used by the one or more processors, cause the one or more processors to:
   identify one or more links in a document object model of a document corresponding to a current page;
   create an index containing the one or more links, the index including coordinates of the one or more links and predefined trigger area coordinates of an individual trigger area for each of the one or more links, wherein each trigger area is a predefined area around a corresponding link;
   detect a user interaction within a first trigger area indicating a prediction a user will select a first link corresponding to the trigger area, the user interaction occurring before selection of the first link associated with the first trigger area, wherein the user interaction corresponds to a second trigger area associated with a second link;
   disable a standard click behavior for the first link and the second link;
   download content of target pages that will be updated upon selection of a link, the target pages corresponding to the first link and the second link;
   detect a user interaction with the link, the link being one of the first link or the second link; and
   transition to the target page corresponding to the link.

* * * * *